Feb. 24, 1931.　　　　G. CABBAGE　　　　1,793,542

NUT LOCK

Filed July 15, 1929

George Cabbage *Inventor*

By *C. A. Snow & Co.*

*Attorneys*

Patented Feb. 24, 1931

1,793,542

UNITED STATES PATENT OFFICE

GEORGE CABBAGE, OF EVANSVILLE, INDIANA

NUT LOCK

Application filed July 15, 1929. Serial No. 378,536.

This invention relates to nut locks, one of the objects being to provide a washer of novel construction adapted to be interposed between a nut and a fishplate for the purpose of gripping the fishplate to hold the washer against rotation in one direction and, at the same time, engage the nut so as to hold it from unscrewing.

Another object is to provide a washer having a plurality of teeth so located that all of them will bite at one time into the surface of the fishplate, thereby insuring a tight grip.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown. In said drawings, Figure 1 is a transverse section through a rail and fishplate provided with a bolt and nut lock such as constitutes the present invention.

Figure 1:
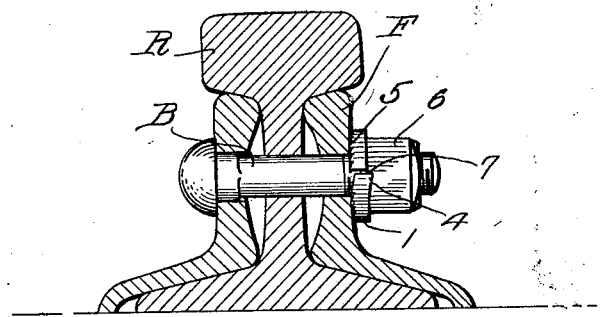
Figure 2:
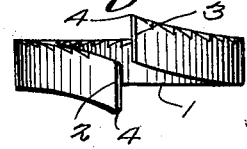
Figure 2 is an elevation of the washer.
Figure 3:
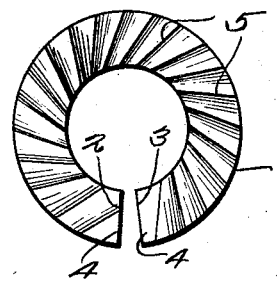
Figure 3 is a plan view thereof.
Figure 4:
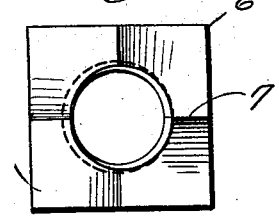
Figure 4 is an inner face view of the nut.

Referring to the figures by characters of reference, 1 designates a resilient metal washer, preferably of hard steel, the same being split so as to provide terminals 2 and 3 offset in opposite directions to produce noses 4. One edge of the washer is formed with teeth 5 extending from the outer to the inner peripheries of the washer. These teeth are not radially disposed but are tangent to an imaginary circle concentric with the washer. All of the teeth are shaped like ratchet teeth so as to bite into a surface when an attempt is made to rotate the washer in one direction.

The washer is of uniform thickness except for the recesses between the teeth and is adapted to be placed about a bolt B between a fishplate F and a nut 6. This nut, which is adapted to be screwed on to the bolt, is formed in one face with radial teeth 7 that preferably divide the nut into quarters.

After the parts have been assembled, the nut is tightened on the bolt and the teeth 7 will slip over the adjacent nose 4 while at the same time the teeth 5 will be pressed toward the adjoining surface of the fishplate F. The washer will be gradually straightened out or flattened as the nut is screwed in place until finally the nose 4 extending from that face of the washer on which the teeth 5 are located will be pressed back into the same plane with the active edges of the teeth and said nose as well as all of the teeth will be forced into the engaged surface. At the same time the other nose will remain in engagement with one of the teeth 7 of the nut. This arrangement will operate efficiently to prevent the nut from being unscrewed from the bolt.

While the nut lock has been shown applied to the fishplate F of a rail R, it is to be understood that it can be used on bolts whereever employed.

It is to be understood that these improvements can be used with nuts of all shapes and sizes.

What is claimed is:

The combination with a plate having a flat surface, and a bolt extending through the plate, of a split washer mounted on the bolt and having its terminals offset in opposite directions respectively to provide noses, an annular series of ratchet teeth on one face of the washer extending from the inner to the outer periphery thereof, said teeth being tangent to an imaginary circle concentric with the washer and adapted to bite into the flat surface of the plate, and a nut engaging the bolt provided with radial teeth for engagement with one of the noses, said nut constituting means for flattening the washer and to force the other nose and the teeth into the flat surface of the plate.

In testimony that I claim the foregoing as my own, I have hereto affixed my signature.

GEORGE CABBAGE.